United States Patent Office 2,988,546
Patented June 13, 1961

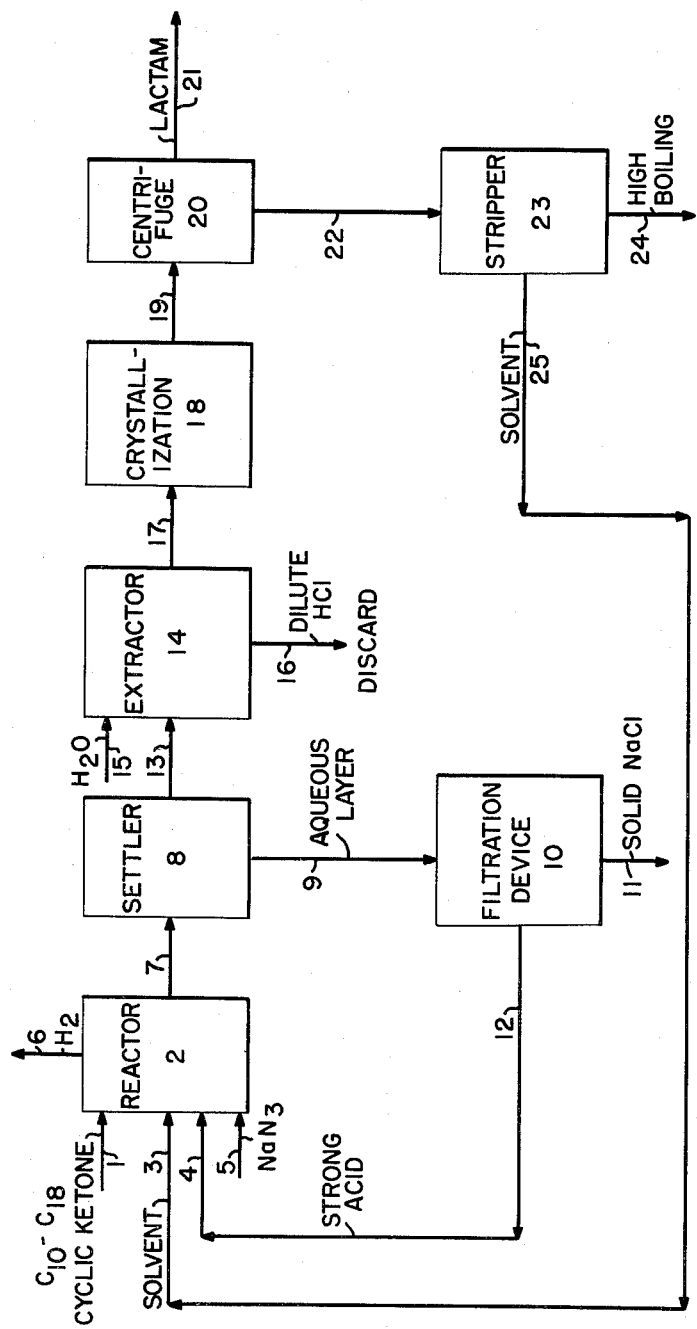

2,988,546
PREPARATION OF LACTAMS FROM CYCLIC KETONES
Samuel B. Lippincott, Springfield, and Herbert K. Wiese, Cranford, N.J., assignors to Esso Research and Engineering Company, a corporation of Delaware
Filed Mar. 2, 1959, Ser. No. 796,635
12 Claims. (Cl. 260—239.3)

The present invention relates to a new and improved process for the conversion of $C_{10}$ to $C_{18}$ cyclic ketones to the corresponding lactams. More particularly, this invention relates to a process wherein the cyclic ketone is reacted with hydrazoic acid in the presence of a strong acid to obtain the lactam, the hydrazoic acid being generated from an alkali azide such as sodium azide. The solid mineral salt which separates from the reaction mixture during the reaction is separated by filtration and the filtrate is allowed to settle. The salt free mineral acid is withdrawn, combined with the required amount of makeup acid and is recycled to the reactor. Most particularly, this invention relates to an improved process for the preparation of dodecanolactam.

The present invention provides large advantages over the prior art as exemplified in the processes used for the production of caprolactam. In these processes, whether based on the Schmidt reaction or the Beckmann rearrangement, large amounts of a concentrated mineral acid, either hydrochloric or sulfuric, is used and this must be neutralized with potash, caustic soda before the product can be isolated from the reaction mixture. See for example British Patent 723,594. Thus, a large amount of acid and caustic, or its equivalent, are expended and in addition the disposal of wastes from the process presents considerable problems. In the present process for the production of dodecanolactam these disadvantages are avoided by first removing the byproduct, the salt of the mineral acid produced in the reaction with alkali azide, and then recycling the mineral acid phase. This is made possible by the discovery that unlike caprolactam, dodecanolactam separates from the mineral acid phase.

The dodecanolactam of this invention is prepared from cyclododecanone. This material is known in the art, being prepared by trimerizing butadiene with alkyl metal type catalysts to 1,5,9-cyclododecatriene, epoxidizing to the monoepoxide followed by hydrogenation of the monoepoxide to cyclododecanol and thence dehydrogenating to cyclododecanone. This process is outlined, for example, in Angewandte Chemie, vol. 69, No. 11:397 (June 7, 1957). Although four stereo isomers of 1,5,9-cyclododecatriene are theoretically possible only two have thus far been isolated. These are the cis, trans, trans (cis., tr., tr.) and the trans, trans, trans (tr., tr., tr.) as shown by the formulas below.

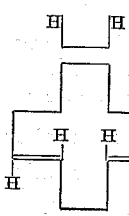

Cis., tr., tr.; M.P., −18° C.

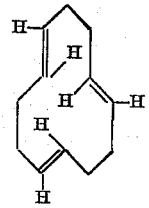

Tr., tr., tr.; M.P., 34° C.

Throughout this specification it will be assumed that either of the isomers above represented or of the other isomers may be utilized or mixtures thereof.

The process of the present invention will be more clearly understood from a consideration of the figure which is a diagrammatic representation of the process for the production of dodecanolactam. Thus, referring to the figure, cyclododecanone is supplied through line 3 to reactor 2 with a solvent selected from the group consisting of acetic acid, trichloroethylene, chloroform, carbon tetrachloride, dioxane and benzene, cyclohexane and n-hexane. A mineral acid is supplied through line 4 and sodium azide is supplied through line 5. Since cyclododecanone is a solid the choice of the correct solvent is important. It has now been found that preferably benzene or other inert hydrocarbons, or chlorinated hydrocarbons should be used in this process. In reactor 2, the amount of concentrated acid should be at least 100% in excess, and preferably 500% or greater in excess of that required to fully react the sodium azide. Thus hydrazoic acid is liberated in situ in the reactor.

Sufficient solvent should be used to maintain cyclododecanone in solution during its residence in reactor 2. This may be as little as one part by weight of solvent to 1 part of cyclododecanone. However, it is preferable to add sufficient solvent to reactor 2 so that additional solvent need not be added to settler 8 or extractor 14. In the case of the preferred solvent, benzene, 5 parts of solvent by weight to one of cyclododecanone is sufficient. More solvent may, of course, be used but this may necessitate a concentration step before the crystallization step and would not be economical. It may be advantageous, however, to use the minimum amount of solvent in reactor 2 and add more solvent, or even a different solvent, to the settler 8 or extractor 14. This makes possible the use of a solvent in the extraction step which is reactive to sodium azide and which therefore cannot be added to reactor 2. However, such mixed solvents complicate solvent recovery and recycle and are not preferred.

If the reactants, sodium azide and cyclododecanone, are pure they may be added to reactor 2 in equimolar quantities. However, economies often dictate that an excess of the less expensive reactant be used in order to raise the yield based on the more expensive one. While equimolecular quantities are preferred, more or less sodium azide may be used, say 25–40 parts by weight to 100 parts of cyclododecanone. The temperature in reactor 2 must be maintained at a relatively low value, 20–30° C. being preferred. However, temperatures as low as 0° C. and as high as 50° C. may be used. Reaction time depends upon the reaction temperature but even more, it depends upon the rate at which heat and nitrogen can be removed from the reaction zone. Sufficient time must be allowed for completion of the reaction as indicated by the rate of nitrogen evolution. Although operation at atmospheric pressure is preferred higher or lower pressures may be used, higher pressures being required if hydrochloric acid containing more than 40% by weight hydrogen chloride is used. Pressures of slightly less than one atmosphere to 10 atmospheres may be used.

Returning to the figure, nitrogen is taken overhead from reactor 2 through line 6 and the reaction mixture is passed through line 7 to settler 8. Here aqueous mineral acid is separated from the organic solvent and dodecanolactam layer or layers. The aqueous acid layer is then withdrawn through line 9. This layer contains the sodium salt formed in the reaction. By controlling the amount and concentration of the acid used it is possible to obtain a substantial crystallization of the sodium salt from the aqueous acid and this can then be separated in filtration device 10. A solid sodium salt is removed through line 11 and is discarded. Alternately the filtration step may precede the separation of the liquid layers. This is especially desirable if a heavy solvent such as chloroform is used. Thus, with chloroform used as a solvent it was discovered that the solid layer sometimes was found between the aqueous layer (top) and the chloroform layer. Respectively, for the different acids, concentrations should be 70 to 90 wt. percent for sulfuric acid, 30 to 50 wt. percent for hydrochloric acid and 70 to 90 wt. percent for phosphoric acid. It is extremely important that this sodium salt be separated, otherwise recycling of the aqueous acid could not be obtained due to build-up of the salt. The recovered acid is recycled through line 12 to reactor 2. It should be noted that if sodium azide is added as a solution rather than as a solid it may be necessary to concentrate the recovered acid before recycling. If it is added as a solid no concentration should be necessary, the desired concentration being maintained by adding a more concentrated form of the acid as makeup, for example hydrogen chloride gas.

From the settler 8 the organic solvent layer is passed through line 13 to extractor 14. Here additional amounts of acid are extracted from the organic layer with water supplied through line 15 and dilute acid is discarded through line 16. The dilute acid may be concentrated and recycled if desired. It may be necessary to warm the mixture to prevent crystallization in the extractor. The purified organic layer is then passed through line 17 to the crystallization 18. Crystallization is accomplished by cooling to temperatures in the range of 0 to 20° C. The crystalline slurry is then passed through line 19 to centrifuge 20. The advantages of using benzene as the solvent in this process are large. It has been found that this solvent is excellent for the production of dodecanolactam in that it is not reactive to sodium azide under the conditions of the reaction and thus can be introduced directly into the reactor 2. This is important since cyclododecanone is a solid at the desired reaction temperatures and therefore good contact between the ketone and the hydrazoic acid requires the presence of a solvent. Although chloroform is often mentioned as an ideal solvent for the Schmidt reaction it is less satisfactory for the dodecanolactam process since dodecanolactam will not crystallize readily from chloroform while it does crystallize very readily, and in pure form, from benzene. Other satisfactory solvents for the dodecanolactam process are cyclohexane, normal heptane and the like. From the centrifuge 20 solid product is removed through line 21 and solvent containing dodecanolactam, unreacted cyclododecanone and other impurities is passed through line 22 to stripper 23. The solvent is taken overhead and is recycled through line 25. The impure dodecanolactam is withdrawn through line 24 and is held for further purification by distillation, crystallization or combinations of these.

Although in the above discussion the production of dodecanolactam only is described it is obvious that other $C_{10}$ to $C_{18}$ lactams can be prepared from the corresponding $C_{10}$ to $C_{18}$ cyclic ketones by a similar procedure.

Another factor of this invention deals with the choice of preferred mineral acids to be used to liberate the hydrazoic acid. Early workers in the prior art used concentrated sulfuric acid while more recent investigators suggested concentrated hydrochloric acid. Nowhere, it appears, has the use of aqueous mineral acids such as aqueous sulfuric acid (75–90 wt. percent) or aqueous phosphoric acids been suggested. The present teaching of the use of these acids is considered an important element of the present invention.

The following experiments present data obtained in the laboratory and additionally present methods of carrying out the process which help to define the present invention.

EXAMPLE 1

Acetic acid as solvent

Cyclododecanone (18.2 g., 0.1 mole) and concentrated hydrochloric acid (80 ml.) were added to a flask and stirred while acetic acid was added to dissolve the cyclododecanone. This required considerable acetic acid (450 ml.). Sodium azide (7.8 g., 0.12 mole) was added in small portions over a six hour period. A gas, nitrogen, was evolved after each addition and further additions were not made until the evolution had subsided. The temperature was maintained at 25°±2° C. throughout the reaction. Stirring at room temperature was continued overnight. The mixture was diluted with water (300 ml.) and was filtered to give a clear solution. The filtrate was evaporated on the steam plate. The product was treated with water to dissolve the sodium chloride and was collected on a suction filter. The air dried product (17.6 g.) melted at 148–151°. (Ruzicka, Helv. Chem. Acta 32, 544 (1949) give 153–153.5° C. as the melting point.) Recrystallized from acetone the product melted at 151–153° C. It analyzed as follows.

|   | Found | Theory for $C_{12}H_{23}NO$ |
| --- | --- | --- |
| C | 74.4 | 73.0 |
| H | 11.0 | 11.8 |
| N | 7.1 | 7.1 |

EXAMPLE 2

Chloroform as solvent

Example 1 was repeated but using chloroform (110 ml.) in place of the acetic acid. This gave a two-phase system, the cyclododecanone being soluble in chloroform.

At the end of the reaction period, after stirring overnight at room temperature, water (250 ml.) was added and the layers were separated. The aqueous layer was extracted with a small amount (25 ml.) of chloroform. The combined chloroform layers were washed twice with water (50 ml.), once with dilute (1 N) sodium hydroxide, again with water, and was dried with anhydrous potassium carbonate. The filtered solution was concentrated on the steam bath to about 50 ml., was chilled in an ice bath and was filtered. The air dried product (5.5 g.) melted at 115–118° C. Two more crops were obtained for a total of 12.4 g. The filtrate, on evaporating to dryness, left another 4.4 g. Thus the yield was 16.8 g., only slightly less than in Example 1. However, the melting point indicated that it was quite impure. Recrystallized from acetone it melted at 150–151° C.

EXAMPLE 3

Benzene as solvent

Example 1 was repeated but using benzene (110 ml.) as solvent. During the workup, while washing the solution with water the product tended to crystallize and it was necessary to warm the mixture to keep the product in solution. After the caustic wash, followed by one water wash, the solution was chilled and filtered. The white crystalline product (13. g.) melted at 151–153° C. Evaporating the product to dryness yielded another 5 g. of product. Total yield, 18 g.

The advantage of using benzene as the solvent in this reaction is clear from these examples. Not only is the yield higher and the product purer but it is obtained with less manipulation and waste. The mixture of acetic acid and hydrochloric acid is not a good solvent because large quantities are required to dissolve the cyclododecanone. The lactam is too soluble in the chloroform so that it cannot be crystallized in the pure state. Benzene appears to have just the right characteristics so that the product is maintained in solution during the reaction but can be crystallized from the solution in a relatively pure state by chilling.

During the experiment described in this example it was noticed that a precipitate formed during the reaction which dissolved again when water was added. This is sodium chloride which is relatively insoluble in the concentrated acid. Its appearance at this point in the reaction makes possible the recycle operation for the concentrated hydrochloric acid of this invention.

EXAMPLE 4

Example 3 was repeated but using 100 ml. of 80% sulfuric acid in place of the hydrochloric acid. At the end of the reaction of period 200 ml. water was added to dissolve the sodium hydrogen sulfate that had separated. The benzene layer was washed twice with water then with dilute caustic. It was necessary to warm the mixture during the washing process to prevent crystallization of the product. 11.6 g. of dodecanolactam product crystallized from the benzene. It melted at 152° C.

EXAMPLE 5

Example 4 was repeated but using 85% phosphoric acid. A precipitate formed, probably sodium dihydrogen phosphate. Workup of the product yielded 10.7 g. dodecanolactam of product melting at 152° C.

EXAMPLE 6

A reaction flask equipped with a stirrer and a thermometer was charged with 113.6 g. of cyclododecanone, 600 ml. of benzene and 600 ml. of concentrated hydrochloric acid. Sodium azide (48 g.) was added in small portions to the stirred mixture over an eight hour period and the mixture was stirred overnight. The temperature was maintained at 25–30° throughout the addition. The mixture was allowed to settle and the liquids were decanted from the solid sodium chloride. The salt was extracted three times with 50 ml. portions of benzene. It was then taken up in water and was evaporated to dryness on a steam bath. It weighed 60 g. The benzene used to extract the sodium chloride was added to the liquid products and the mixture was allowed to settle. It separated into three layers. The lower layer was hydrochloric acid. The middle layer was presumed to be a complex of the lactam and hydrogen chloride while the upper layer was largely benzene. The hydrochloric acid layer was drawn off, was diluted with 2 volumes of water and was extracted three times with 100 ml. portions of benzene. The water layer was evaporated to dryness leaving 3 g. of solid (NaCl). The benzene layer was also evaporated to dryness leaving 4.2 g. of residue. Thus, it appears that the hydrochloric acid layer can be recycled without recycling appreciable amounts of product.

Water (100 ml.) was added to the separation funnel containing the organic layers and the mixture was agitated. Upon settling two layers appeared, a lower aqueous layer and an upper layer of product in benzene. The aqueous layer was withdrawn and the upper layer was washed twice with 100 ml. portion of water. During the last wash product began to crystallize from the benzene and it was necessary to heat the mixture to prevent this. The combined aqueous layers were evaporated to dryness leaving 1.5 g. solid. The warm benzene solution was extracted with 100 ml. of 1 N sodium hydroxide and finally with 100 ml. of water. The benzene layer was then chilled and centrifuged. The precipitate was air dried. It weighed 66 g. and melted at 150–152° C. A second crop (14 g.) was obtained melting at 105–130°. The yield of lactam, 80 g., was 65%.

EXAMPLE 7

The cyclododecanone used in this experiment was a purer grade than that used in previous experiments. It melted at 59–60° C. and had a carbonyl number of 295 (theoretical—308).

The cyclododecanone (119.4 g.) was treated with sodium azide as described above in Example 1. The reaction mixture was diluted with water equal in volume to the volume of concentrated hydrochloric acid and the layers were separated. The organic layer was extracted four times with 250 ml. portions of water and once with 150 ml. of sodium hydroxide (1 N). The product crystallized from the benzene.

Crop 1—87.3 g.—M.P. 150–152° C.
Crop 2—12.0 g.—M.P. 142–147° C.

The yield of lactam was 99.3 g. or 77%. This probably could be increased by recrystallization of the tailings.

What is claimed is:

1. The improved process for the preparation of $C_{10}$ to $C_{18}$ lactams which comprises reacting a $C_{10}$ to $C_{18}$ monocyclic ketone with an alkali mineral azide in the presence of a strong mineral acid at temperatures of 0 to 50° C. and pressures of 0.7 to 10 atmospheres, allowing an aqueous layer to separate from an organic layer in the reaction products, separating crystals of a solid alkali metal salt formed in the reaction from the aqueous layer and recycling the purified aqueous layer to the process.

2. The process of claim 1 in which a $C_{10}$ to $C_{18}$ lactam is recovered from the organic layer by crystallization.

3. The process of claim 1 in which additionally a solvent selected from the group consisting of benzene, cyclohexane, chloroform, carbon tetrachloride, hexane and heptane is present in the ratio of 1 to 10 parts by weight of solvent to 1 part of cyclic ketone.

4. The process of claim 3 in which the solvent is benzene and in which the ratio of solvent to cyclic ketone is 3 to 10 parts solvent to 1 part cyclic ketone.

5. The process of claim 3 in which the solvent is chloroform and in which the ratio of solvent to cyclic ketone is 1 to 5 parts solvent to 1 part cyclic ketone.

6. The process of claim 1 wherein ratios of sodium azide to cyclic ketone are in the range of 25 to 45 wt. percent of the former to the latter.

7. The process of claim 1 in which the strong acid is sulfuric acid having a concentration of 70 to 90 wt. percent.

8. The process of claim 1 in which the strong acid is hydrochloric acid having a concentration of 30 to 50 wt. percent.

9. The process of claim 1 in which the strong acid is phosphoric acid having a concentration of 70 to 90 wt. percent.

10. The improved process for the preparation of cyclododecanolactam which comprises reacting cyclododecanone with an alkali metal azide in the presence of a strong mineral acid at temperatures of 0 to 50° C. and pressures of 0.7 to 10 atmospheres, allowing an aqueous layer to separate from an organic layer in the reaction products, separating crystals of solid alkali metal salts formed in the reaction from the aqueous layer and recycling the purified aqueous layer to the process.

11. The process of claim 1 in which the cyclic ketone is cyclododecanone, the alkali azide is sodium azide, the strong mineral acid is 70–90 wt. percent sulfuric acid, and benzene is present in the ratio of 1 to 10 parts of benzene to 1 part of cyclododecanone.

12. The process of claim 1 in which the cyclic ketone is cyclododecanone, the alkali azide is sodium azide, the strong mineral acid is 30–50 wt. percent hydrochloric acid, and benzene is present in the ratio of 1 to 10 parts of benzene to 1 part of cyclododecanone.

References Cited in the file of this patent

Theilheimer: Synthetische Methoden der, vol. 4, No. 326 (1950), Organischen Chemie.

Iwakura: Chem. Abstracts, vol. 44, p. 5103 (Abstracting Iwakura Chem. High Polymers (Japan), vol. 2, pp. 305–7 (1945)).